US006254158B1

(12) United States Patent
Brunelle (10) Patent No.: US 6,254,158 B1
(45) Date of Patent: Jul. 3, 2001

(54) DEVICE FOR CARRYING A STACK OF TRAYS

(75) Inventor: Steven J. Brunelle, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/565,182

(22) Filed: May 3, 2000

Related U.S. Application Data (62) Division of application No. 09/016,064, filed on Jan. 30, 1998, now Pat. No. 6,089,637.

(51) Int. Cl.[7] .................................................. B65D 5/46
(52) U.S. Cl. ........................... 294/158; 294/97; 211/59.1
(58) Field of Search ................................... 294/158, 161, 294/164, 170, 93, 97, 26.5, 61; 211/54.1, 59.1; 402/7, 15, 80 R, 11, 19, 21, 24, 57, 500; 229/915

(56) References Cited

U.S. PATENT DOCUMENTS

| 524,035 | 8/1894 | White | 294/61 |
|---|---|---|---|
| 1,366,763 | 1/1921 | Berry | 294/28 |
| 1,492,250 | * 4/1924 | Klette | 402/7 |
| 2,541,144 | 2/1951 | Anderson | 294/61 |
| 3,016,136 | 1/1962 | Poupitch | 206/163 |
| 3,083,886 | 4/1963 | Fry | 294/158 |
| 3,633,958 | 1/1972 | Mesrobian | 294/61 |
| 3,642,263 | * 2/1972 | Pine et al. | 432/261 |
| 4,036,424 | * 7/1977 | Thany | 294/158 |
| 4,039,119 | * 8/1977 | Crane | 206/510 |
| 4,316,694 | * 2/1982 | Martin | 294/158 |
| 4,519,504 | * 5/1985 | Nausedas | 206/554 |
| 4,573,729 | * 3/1986 | Cookson | 294/158 |
| 4,736,978 | 4/1988 | Cielker | 294/97 |
| 4,784,398 | 11/1988 | Lund | 294/93 |
| 4,869,613 | * 9/1989 | Corey | 402/7 |
| 4,944,081 | 7/1990 | Ross | 294/95 |
| 5,067,237 | 11/1991 | Holder | 294/97 |
| 5,593,242 | * 1/1997 | Mathias | 402/7 |
| 6,061,927 | * 1/2000 | Krupp | 211/126.2 |

* cited by examiner

Primary Examiner—Dean J. Kramer
Assistant Examiner—Paul T. Chin
(74) Attorney, Agent, or Firm—Knobbe, Martens, Olson & Bear, LLP (57) ABSTRACT

Disclosed is a device for supporting and transporting at least one object which has a plurality of apertures extending therethrough. The device comprises a handle, and a plurality of legs connected to the handle. At least a portion of the legs are configured to be inserted into at least one of the plurality of apertures. The device further comprises a plurality of support members attached to the portion of the plurality of legs and sized to fit within the apertures in object. Each of the support members have a support edge and are movable to an extended position wherein the support edges collectively define a surface supporting the at least one object. The device facilitates carrying of the objects.

19 Claims, 10 Drawing Sheets

DEVICE FOR CARRYING A STACK OF TRAYS

RELATED APPLICATION

This application is a divisional of U.S. patent application Ser. No. 09/016,064, filed Jan. 30, 1998, now U.S. Pat. No. 6,089,637 entitled DEVICE FOR CARRYING A STACK OF TRAYS.

BACKGROUND OF THE INVENTION

1. Field of the Invention

The invention relates to a carrying device. More particularly, the invention relates to a device for carrying a plurality of trays that are arranged in a stack.

2. Description of the Related Art

Thin small outline package trays, or TSOP trays, are devices that are used to carry a plurality of computer chips or other small objects. The trays define a planar surface on which a plurality of these small objects are positioned for transport or storage. The trays should be large enough to carry a high number of the computer chips, which are typically organized in rows and columns on the tray surface. During storage or movement, the trays are typically stacked atop one another to conserve space. Unfortunately, as the number of trays in the stack increases, the stack becomes increasingly difficult to carry or move.

TSOP trays are often used to feed computer chips into a chip handler or sorter, which is a device that is used to test the chips and sort them according to the quality of the chips. Typically, a user lowers a stack of the trays into a bin attached to the chip handler. The chips are then removed from the trays, tested for quality, and then sorted by the chip handler and returned to the trays.

Unfortunately, the size of the stack makes it difficult and awkward for the user to lower the stack of trays into the bin of the chip handler. This is particularly true since the bottom of the bin is often deep. Additionally, as the size of the stack increases, the likelihood of a person dropping the stack also increases, which often leads to lost and damaged parts as well as jammed handlers. While the size of the stack of trays may be reduced by lowering the number of trays in the stack, this would reduce efficiency.

The bulkiness of the trays also increases the likelihood that the trays will be dropped or mishandled during transport A significant amount of time is often wasted picking up trays and parts that have been scattered after an unfortunate fall.

There is, therefore, a need for a device for carrying a plurality of TSOP trays that are arranged in a stack. The device should provide a user with an easy means of carrying and transporting the stack of trays and should be easily operated an manufactured.

SUMMARY OF THE INVENTION

The aforementioned needs are satisfied by the invention which relates to a device for carrying a stack of TSOP trays.

In one aspect of the invention, there is disclosed a device for supporting and transporting at least one object which has a plurality of apertures extending therethrough. The device comprises a handle, and a plurality of legs connected to the handle. At least a portion of the legs are configured to be inserted into at least one of the plurality of apertures. The device further comprises a plurality of support members attached to the portion of the plurality of legs and sized to fit within the apertures in object. Each of the support members have a support edge and are movable to an extended position wherein the support edges collectively define a surface supporting the at least one object. The device facilitates carrying of the objects.

In another aspect of the invention, there is disclosed a device for carrying and transporting at least one object which has a plurality of apertures extending therethrough. The device comprises a handle and an outer housing having a handle section and a plurality of legs connected thereto. Each of the plurality of legs includes an aperture extending through a portion thereof. The device further comprises an inner frame coupled to the outer housing, the inner frame having a handle section positioned adjacent the handle section of the outer housing and a plurality of legs slidably positioned within the plurality of legs of the outer housing, and a plurality of support members attached to a portion of the plurality of legs of the inner frame. Each of the plurality of support members includes a support edge. The plurality of support members are movable to an extended position wherein the support members extend outward through the apertures in the legs of the outer frame so that the support edges of the support members cooperate to support the at least one object. The support members move to the extended position when the handle section of the inner frame is moved toward the handle section of the outer housing.

In another aspect of the invention, there is disclosed a system for carrying objects. The system comprises at least one object and a carrying device comprising a handle, at least one leg connected to the handle, and a first support member connected to the leg. The first support member has a support edge sized to support at least a portion of the at least one object.

In yet another aspect of the invention, there is disclosed a device for carrying at least one object having a plurality of apertures extending therethrough. The device comprises a handle, a plurality of hollow legs connected to the handle, the plurality of legs each having a height greater than the height of the at least one object and a plurality of support members coupled to the plurality of hollow legs and movable into an extended position. The support members collectively define a support surface for supporting the at least one object thereon. The device also includes means for moving the support members to the extended position.

In yet another aspect of the invention, there is disclosed a device for supporting and transporting at least one object which has a plurality of apertures extending therethrough The device comprises a handle, a plurality of legs connected to the handle, wherein at least a portion of the legs are configured to be inserted into at least one of the plurality of apertures, and means for supporting the at least one object when the legs are inserted into the apertures.

In yet another aspect of the invention, there is disclosed a method of moving a stack of trays. The method comprises stacking a plurality of trays atop one another to form a stack of trays, wherein each of the trays has a plurality of apertures therein and wherein the step of stacking includes aligning apertures in adjacent trays with each other, inserting each of a plurality of legs of a tray carrier into a corresponding one of the plurality of apertures in the stack of trays, locking the tray carrier to the stack of trays, and lifting the tray carrier so that the tray carrier supports the stack of trays.

In another aspect of the invention, there is disclosed a method of transporting a stack of trays. The method comprises forming a stack of trays such that a bottommost tray supports the other trays in the stack of trays, coupling a plurality of legs of a tray carrier to the stack of trays so that a plurality of support members on the legs provide a support surface for the bottommost tray in the stack of trays, and lifting the tray carrier so that the support surface supports the stack of trays.

In yet another aspect of the invention, there is disclosed a method of carrying at least one tray. The method comprises inserting a leg of a tray carrier through an aperture in the at least one tray so that a bottom end of the leg protrudes through the bottom of the at least one tray, extending a support member outward from the bottom end of the at least one tray so that the support member provides a support surface for the tray, and lifting the tray carrier so that the at least one tray rests on the support surface of the support member.

BRIEF DESCRIPTION OF THE DRAWINGS

These and other features of the invention will now be described with reference to the drawings of one embodiment, which are intended to illustrate and not to limit the invention, and in which:

FIGS. 8A–8C are side views illustrating the support members of the tray carrier of the invention at several stages during their movement from a locked position to an unlocked position.

DETAILED DESCRIPTION OF THE INVENTION

Figure 1:
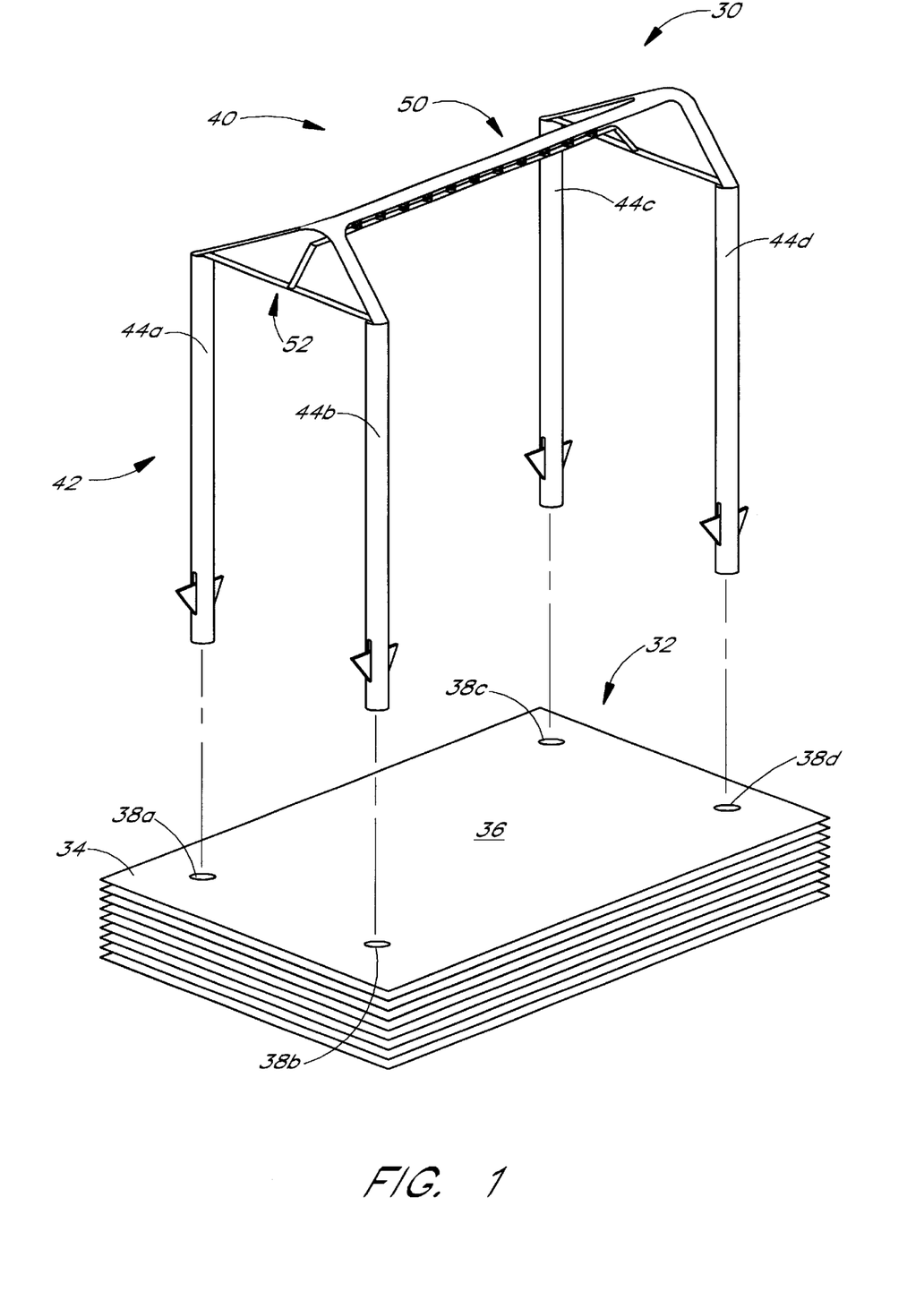
FIG. 1 is a perspective view of a tray carrier of the invention and a stack of TSOP trays.

FIG. 1 is a perspective view of a tray carrier 30 of the invention and a stack 32 of Thin Small Outline Package ("TSOP") trays 34. The tray carrier 30 is configured to mate with the stack 32 of TSOP trays 34 and function as a convenient and easy means of carrying the stack 32, as described more fully below. Although described herein with respect to a stack of TSOP trays 34, it will be appreciated that the tray carrier 30 may also be used to carry any of a wide variety of tray-type devices.

With reference to FIG. 1, each TSOP tray 34 is substantially flat and defines a flat support surface 36 thereon for supporting a plurality of computer chips or other small devices. In the illustrated embodiment, each tray 34 is rectangular-shaped and includes a plurality of holes 38 that extend therethrough. The holes are referred to collectively using the numeral 38 and individually using the suffix "a", "b", "c", or "d". The holes 38 are located adjacent each of the four corners of each TSOP tray 34. Each tray 34 is identical in shape and has dimensions such that the holes 38 of the trays 34 are aligned with one another when the trays 34 are stacked atop one another. The TSOP trays may take on any of a wide variety of shapes that are configured to be stacked atop one another.

With reference to FIG. 1, the tray carrier 30 includes a handle section 40 that is adapted to be gripped by a user. The tray carrier 30 further includes a leg section 42 comprising four parallel legs 44a, 44b, 44c, and 44d which extend downwardly from the handle section 40. The legs 44 are referred to collectively using the reference numeral 44, and are referred to individually using the suffix a, b, c or d. The legs 44 are sized and spaced from one another to fit within the holes 38 in the TSOP trays 34. That is, the legs 44a, 44b, 44c, and 44d of the tray carrier 30 are sized and dimensioned to be simultaneously slid into the holes 38a, 38b, 38c, and 38d, respectively, of the trays 34, as described more fully below.

Figure 2:
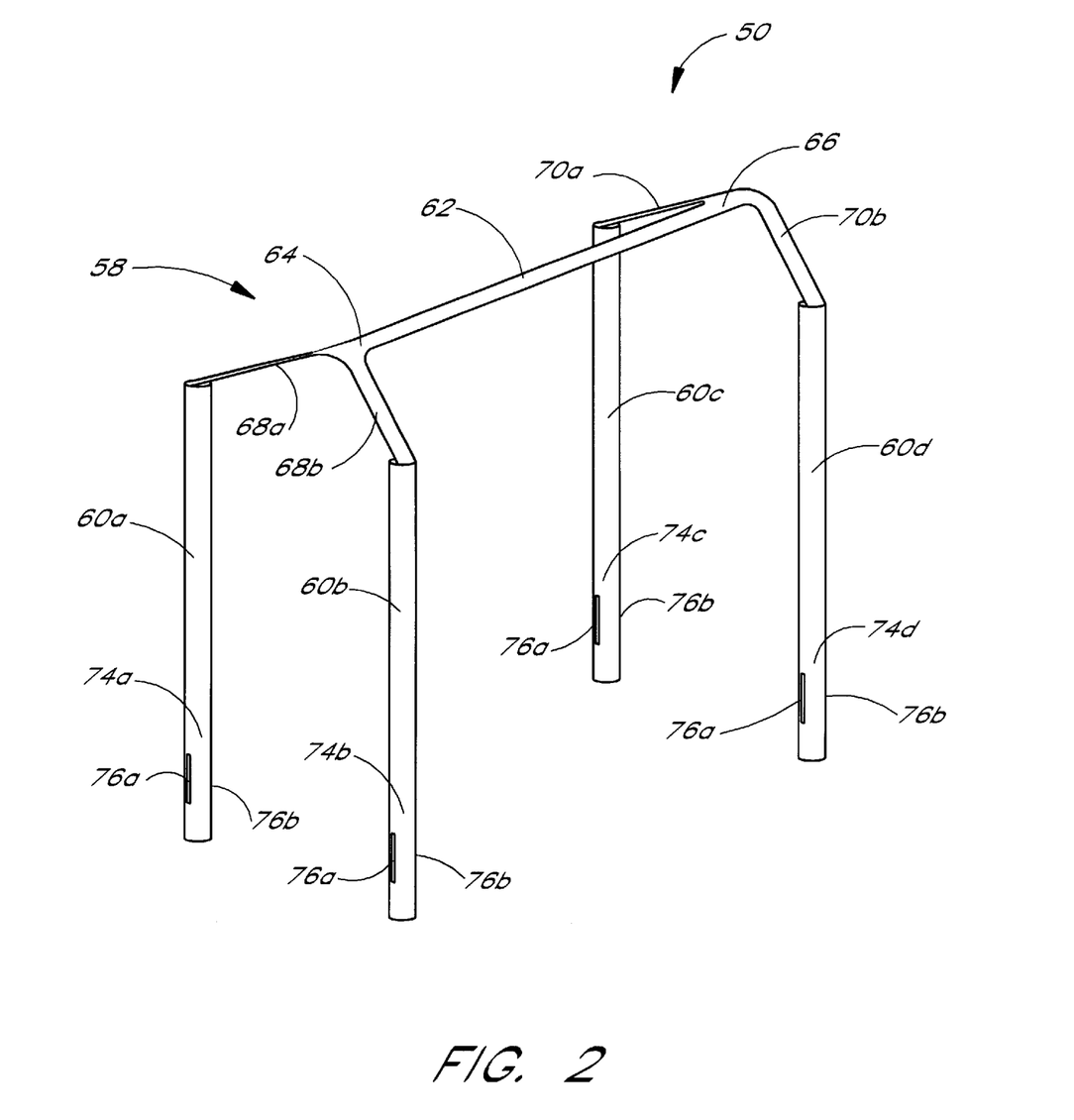
FIG. 2 is a perspective view of an outer member of the tray carrier of the invention.

As shown in FIG. 1, the tray carrier 30 comprises an outer housing or member 50 and an inner frame or member 52 that is slidably mounted within the outer member 50. The inner member 52 is configured to slidably move relative to the outer member 50 to operate the tray carrier 30, as described in more detail below. FIG. 2 is a perspective view of the outer member 50 of the tray carrier 30. The outer member 50 comprises a handle section 58 and a plurality of tubular legs 60a, 60b, 60c, and 60d extending downwardly therefrom. The legs 60 of the outer member 50 are referred to collectively using the reference numeral 60. The handle section 58 includes an elongated handle 62 having a first end 64 and a second end 66. A pair of extenders 68a and 68b extend outwardly in substantially opposite directions and their outer ends extend downwardly at an angle from the first end 64 of the handle 62. Similarly, a pair of extenders 70a and 70b extend outwardly in substantially opposite directions and their outer ends extend downwardly at an angle from the second end 66 of the handle 62.

With reference to FIG. 2, the legs 60a and 60b of the outer member 50 extend downwardly from the ends of the extenders 68a and 68b, respectively. Likewise, the legs 60c and 60d extend downwardly from the ends of the extenders 70a and 70b, respectively. The tubular legs 60 of the outer member 50 are hollow so as to define an elongated cavity within each of the legs 60. The legs 60a–60d each have a lower portion 74a–74d, respectively. A pair of apertures 76a and 76b are positioned in diametrically opposed locations on the lower portion 74a–74d of each of the legs 60a–60d, respectively.

Figure 3:
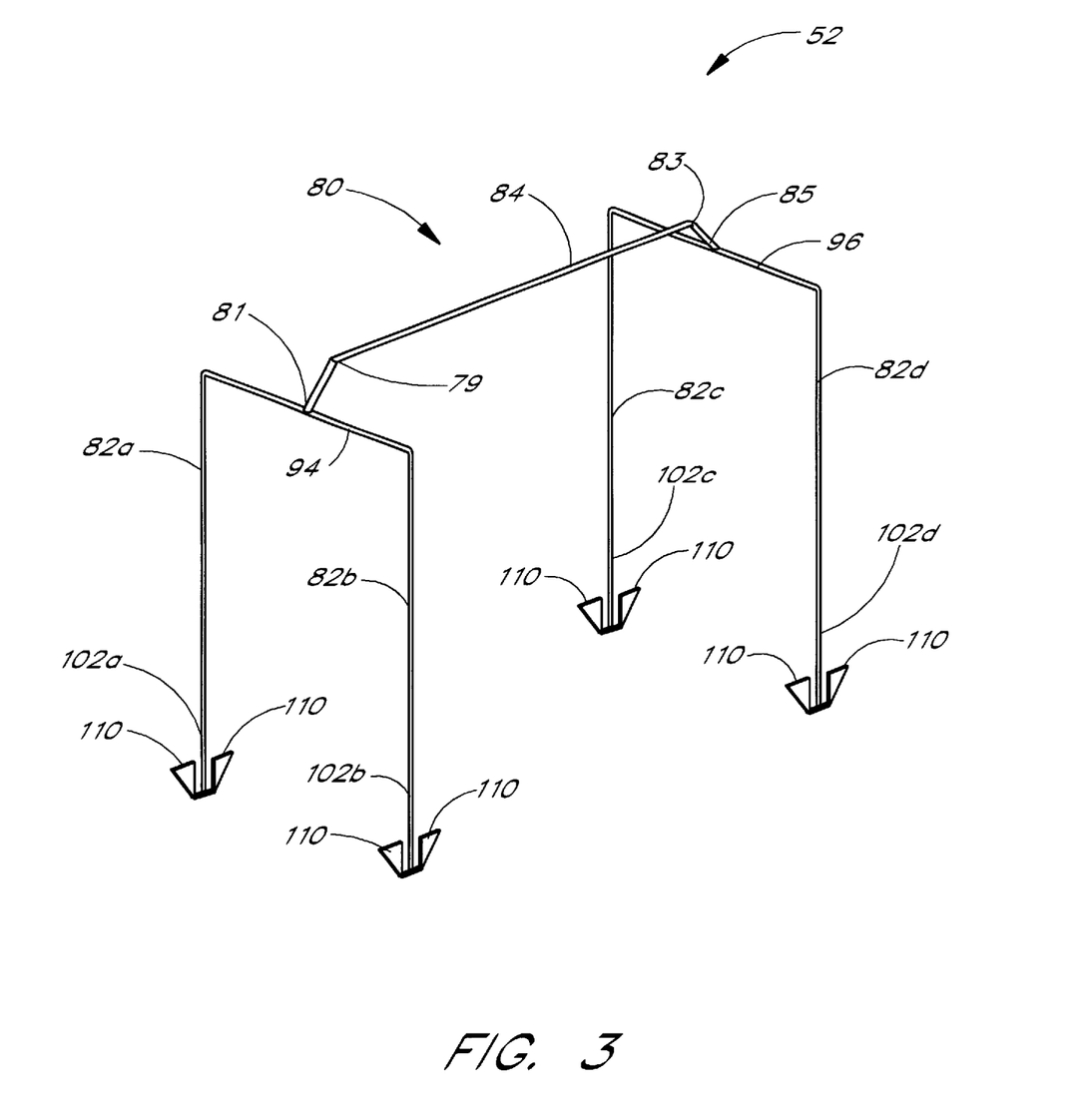
FIG. 3 is a perspective view of an inner member of the tray carrier of the invention.

As shown in FIG. 3, the inner member 52 includes a handle section 80 and a plurality of rods or legs 82a, 82b, 82c, and 82d, (collectively referred to as legs 82) extending downwardly from the handle section 80. The handle section 80 comprises an elongated handle 84 that includes a pair of downward bends 79 and 83 positioned at selected locations along its length. A first end 81 and a second end 85 of the handle 84 connect to a pair of straight, elongated handle extenders 94 and 96. The elongated handle extenders 94 and 96 are oriented to extend substantially normal with respect to the handle 84, and they connect the handle section 80 of the inner member 52 to the legs 82 of the inner member 52. The handle extender 94 has a length substantially equal to the distance between the legs 60a and 60b of the outer member 50. Likewise, the handle extender 96 has a length substantially equal to the distance between the legs 60c and 60d of the outer member 50. It will be appreciated that the handle section 80 could have a variety of shapes such that each of the legs 82 of the inner member 52 are positioned to be inserted simultaneously into each of the legs 60 of the outer member 50.

With reference to FIG. 3, the legs 82 are straight and parallel to one another. Additionally, the legs 82a, 82b, 82c, and 82d each have a lower portion 102a, 102b, 102c, and 102d, respectively, which are referred to collectively using the reference numeral 102. A pair of flat latches or support members 110 are movably mounted at the end of the lower portions 102 of each of the legs 82, as described in more detail below. The legs 82 of the inner member 52 are sized to be slidably inserted into the elongated cavities within the hollow legs 60 of the outer member 50.

Figure 4:
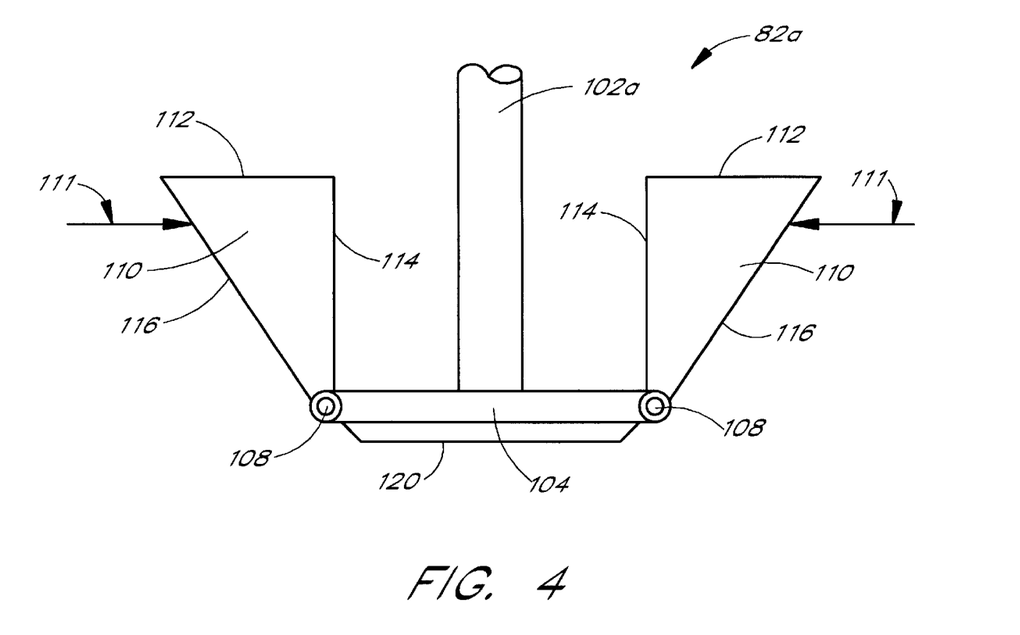
FIG. 4 is a first side view of a pair of support members attached to a portion of a leg of the inner member of FIG. 3.

The configuration of the support members 110 on the lower portions can best be understood by reference to FIG. 4. Referring to that figure, it is noted that each of the legs 82 are identical to one another. Thus, the following description of the lower portion 102a is equally applicable to the portions 102b–102d. An extender arm 104 is attached to the bottom end of the portion 102a and is oriented substantially normal to the leg 82a. The extender arm 104 has a length that is smaller than an internal diameter of the legs 60 of the outer member 50 to allow the lower portion 102a of the inner member 52 to be inserted into the leg 60a of the outer member 50.

As shown in FIG. 4, the support members 110 are rotatably mounted to the ends of the extender arm 104 via a pair rotational connectors, such as a pair of pins 108. In the illustrated embodiment, the support members 110 are triangular-shaped so as to define a substantially straight support edge 112 and a first side edge 114 that extends substantially normal to the support edge 112. The support member 110 also defines a second side edge 116 that extends at an angle relative to the support edge 112. It will be appreciated that the shape of the support members 110 may vary while still being able to accomplish the purpose of the invention.

With reference to FIG. 4, a biasing member or elastic band 120 (shown schematically) is coupled to each of the support members 110 at locations where the support members 110 attach to the extender arm 104. The elastic band 120 is mounted under tension to exert a bias between the support members 110 such that the support members 110 are urged to rotate about the pins 108 to an extended or unlocked position, as shown in FIG. 4. The pins 108 desirably includes an internal latch or stop that prevents the support members 110 from rotating past the extended position. Alternatively, the extender arm 104 could be shaped to prevent the support members 110 from rotating part the extended position. In the extended position, the support edges 112 of the two support members 110 are aligned within a common plane.

Figure 5:
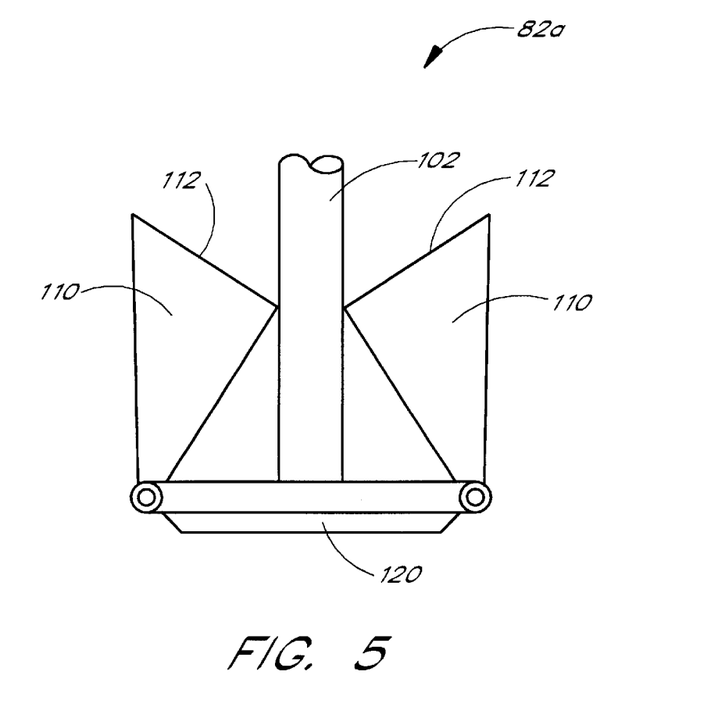
FIG. 5 is a second side view of a pair of support members attached to a portion of a leg of the inner member of FIG. 3.

A force may be applied to the support members 110 in the direction of the arrows 111 to move the support members 110 to a retracted or locked position wherein the support edges 112 of the support members 110 are pushed toward the legs 82, as shown in FIG. 5. In the retracted position, the support edges 112 of the support members 110 are oriented at an angle relative to one another. The elastic band 120 causes the support members 110 to automatically spring to the extended position (FIG. 4) when the support members 110 are unrestrained.

Figure 6A:
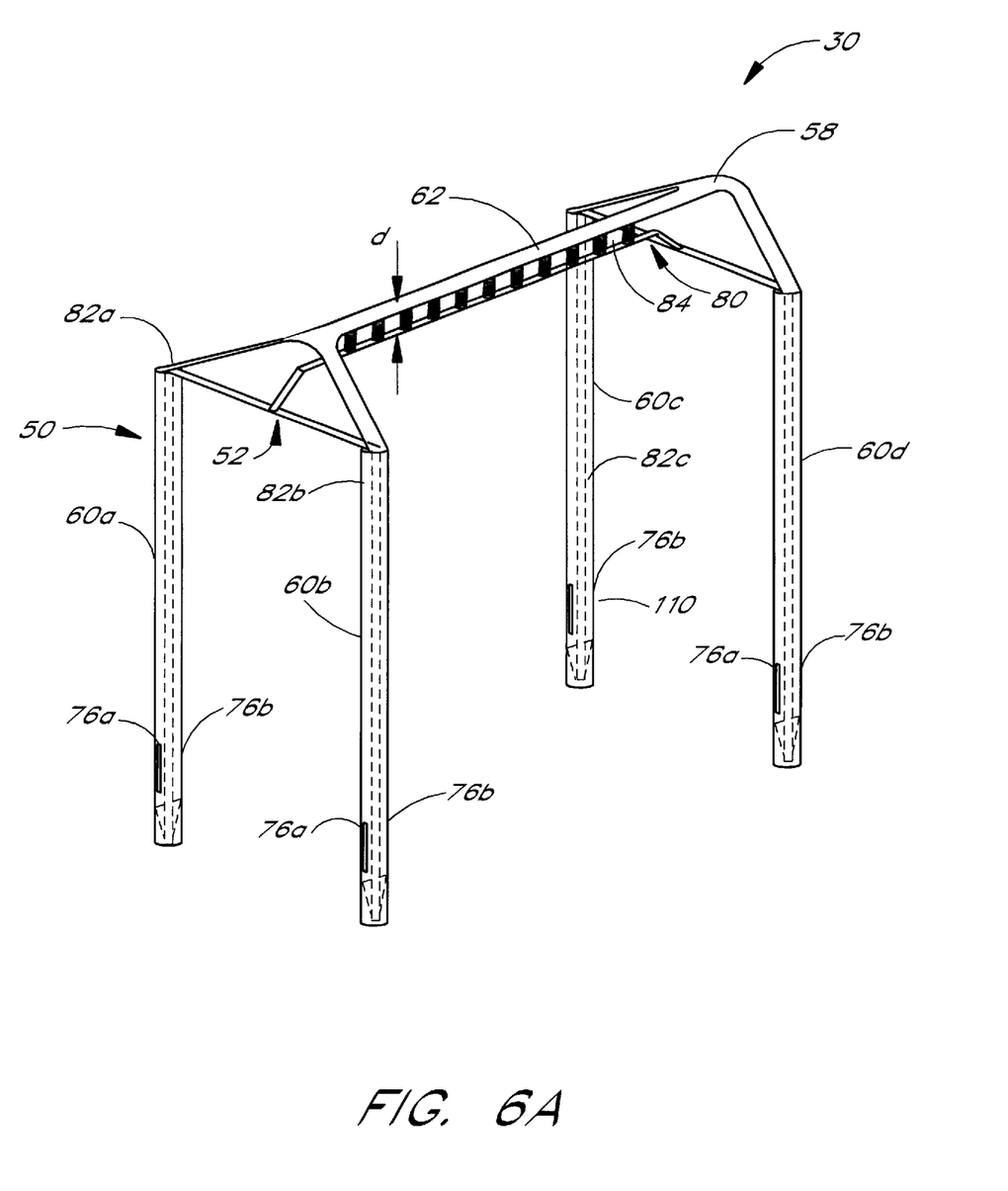
FIG. 6A is a perspective view of the tray carrier of the invention in a nonsupport position.

As shown in FIG. 6A, when the tray carrier 30 is assembled, the inner member 52 is mounted within the outer member 50. Specifically, the legs 82a, 82b, 82c, and 82d of the inner member 52 are slidably positioned within the legs 60a, 60b, 60c, and 60d of the outer member 50, respectively.

When assembled, the handle section 80 of the inner member 52 is also positioned below the handle section 58 of the outer member 50 such that the handle 84 of the inner member 52 is aligned parallel to and immediately below the handle 62 of the outer member 50. As shown in FIG. 6A, the tray carrier 30 is normally in a default or "non-support" position, wherein the handle 84 of the inner member 52 is positioned a short distance d below the handle 62 of the outer member 50. As shown in phantom, the legs 82 of the inner member 52 are fully inserted into the legs 60 of the outer member 50 so that the support members 110 are constrained in the retracted position, as was described above with respect to FIG. 5. Desirably, the distance d is less than approximately three inches.

Figure 6B:
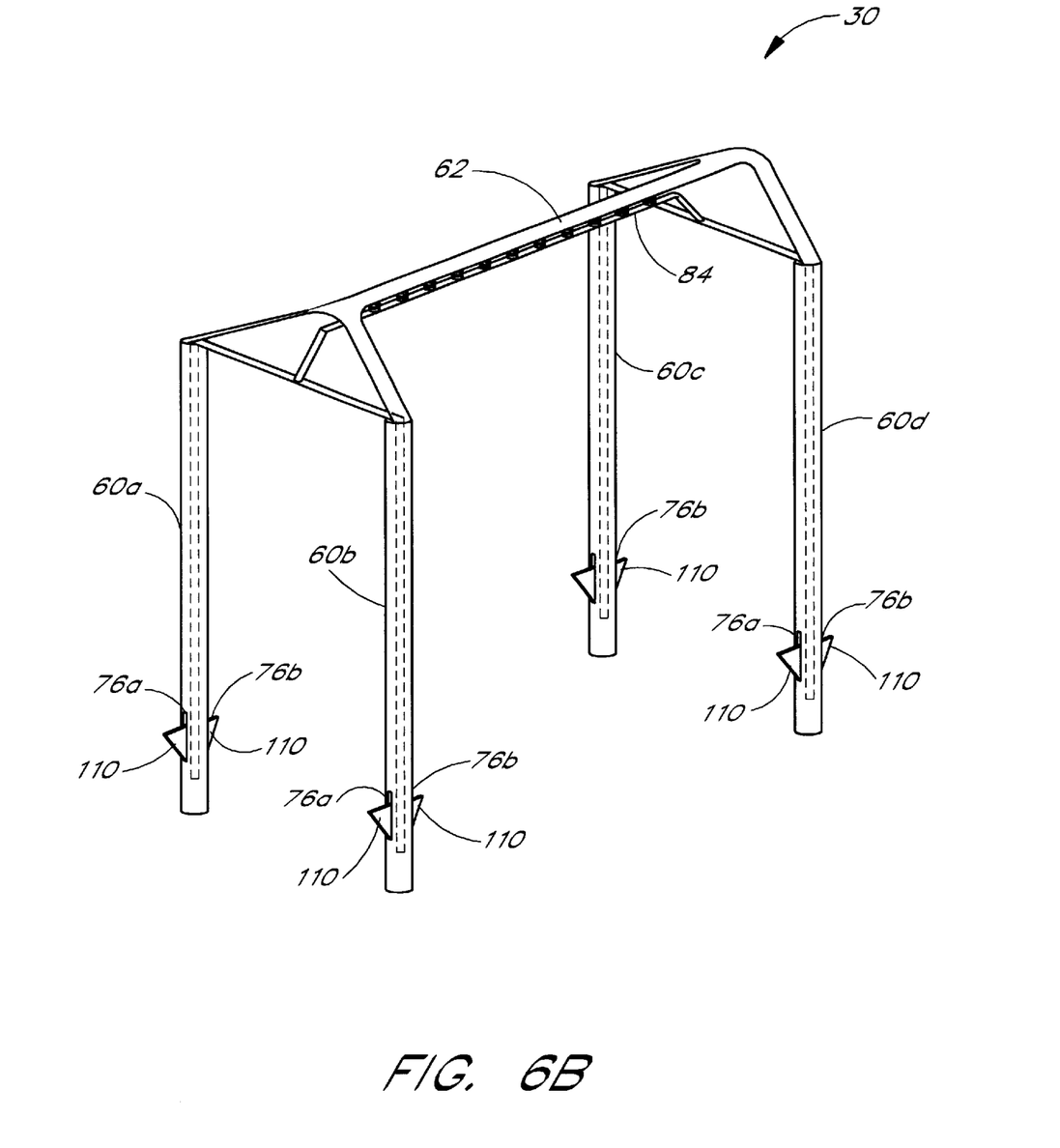
FIG. 6B is a perspective view of the tray carrier of the invention in a support position.

The tray carrier 30 may be moved from the non-support position to a "support" position by moving the handle 84 of the inner member 52 toward the handle 62 of the outer member 50. Desirably, the handle 84 of the inner member 52 is moved toward the handle 62 of the outer member 50 until the handle 84 abuts the handle 62. The legs 82 of the inner member 52 slide upwardly with respect to the legs 60 of the outer member 50 during this movement.

FIG. 6B is a perspective view of the tray carrier 30 in the support position wherein the handle 84 of the inner member 52 has been slid upward to abut the handle 62 of the outer member 50. When the tray carrier 30 is moved to the support position, the support members 110 move into alignment with the apertures 76. The support members 110 thus move to the extended position so that the support members 110 protrude outward through the apertures 76 in the legs 60 of the outer member 50. When the tray carrier 30 is in the support position, the support edges 112 of the support members 110 are aligned within a common plane so as to collectively define a support plane for supporting the stack 32 of TSOP trays 34, as described in more detail below.

Figure 7:
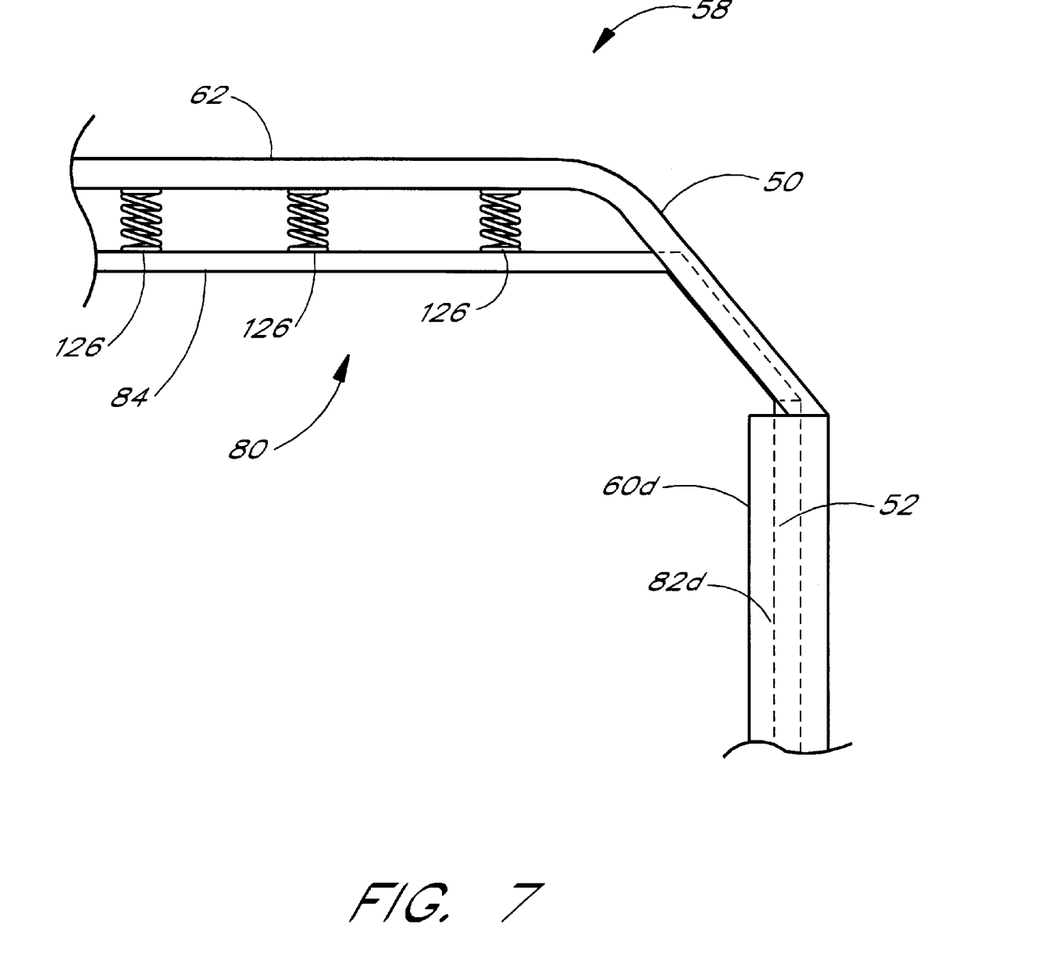
FIG. 7 is an enlarged perspective view of a handle section of the tray carrier of the invention.

FIG. 7 is an enlarged view of the handle sections 58 and 80 of the outer member 50 and the inner member 52, respectively. A plurality of biasing members 126 are positioned between the handle 84 of the inner member 52 and the handle 62 of the outer member 50. The biasing members 126 desirably bias the handle 84 of the inner member 52 away from the handle 58 of the outer member 50 so that the tray carrier 30 is normally urged into the default or non-support position shown in FIG. 6A when the biasing members 126 are unopposed. The biasing members 126 may comprise springs or any other of a wide variety of devices that are configured to provide a biasing force. The tray carrier 30 is moved to the support position by exerting a force on the handle 84 of the inner member 52 to oppose or overcome the force exerted by the biasing members 126.

Figure 8A:
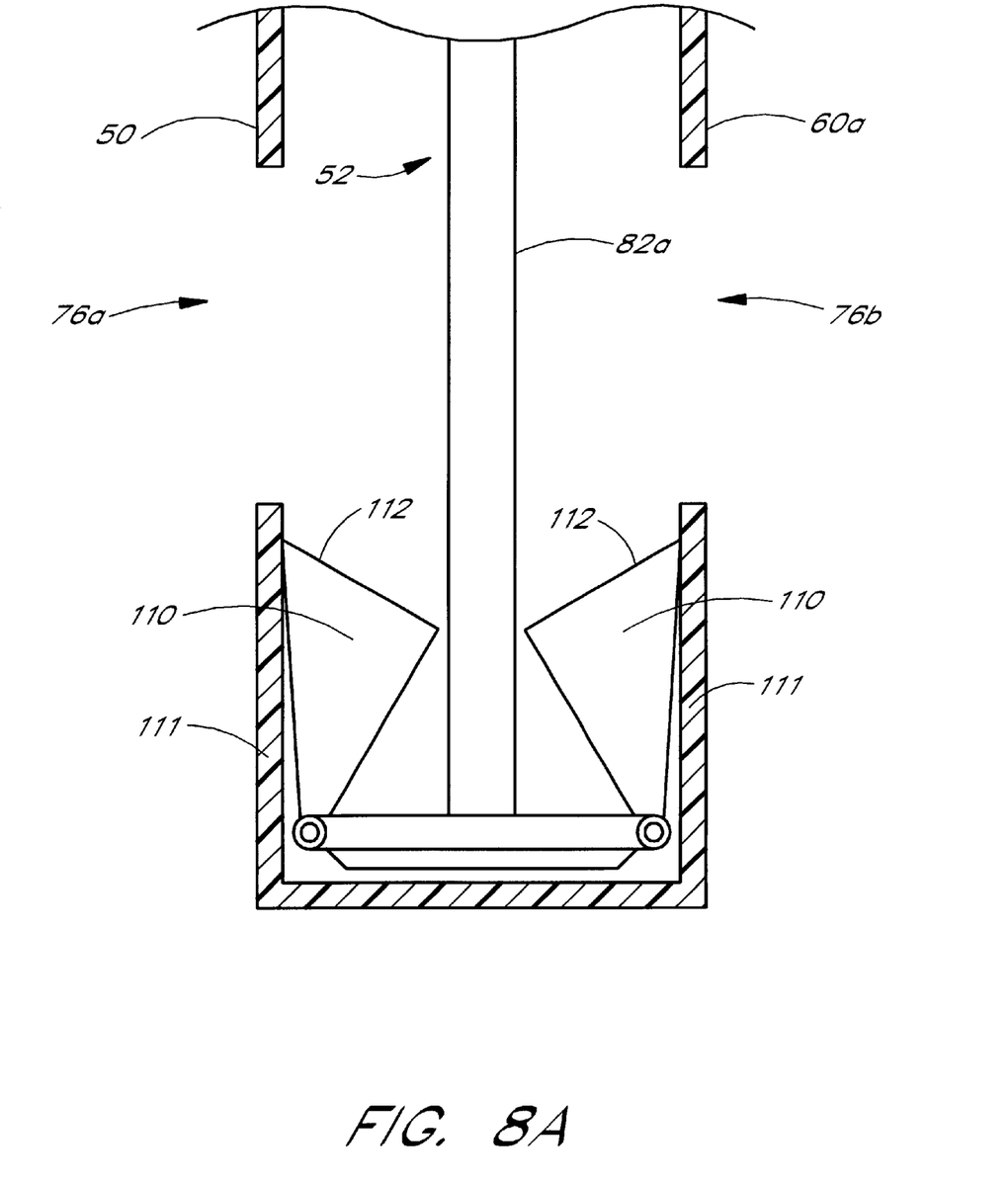
Figure 8B:
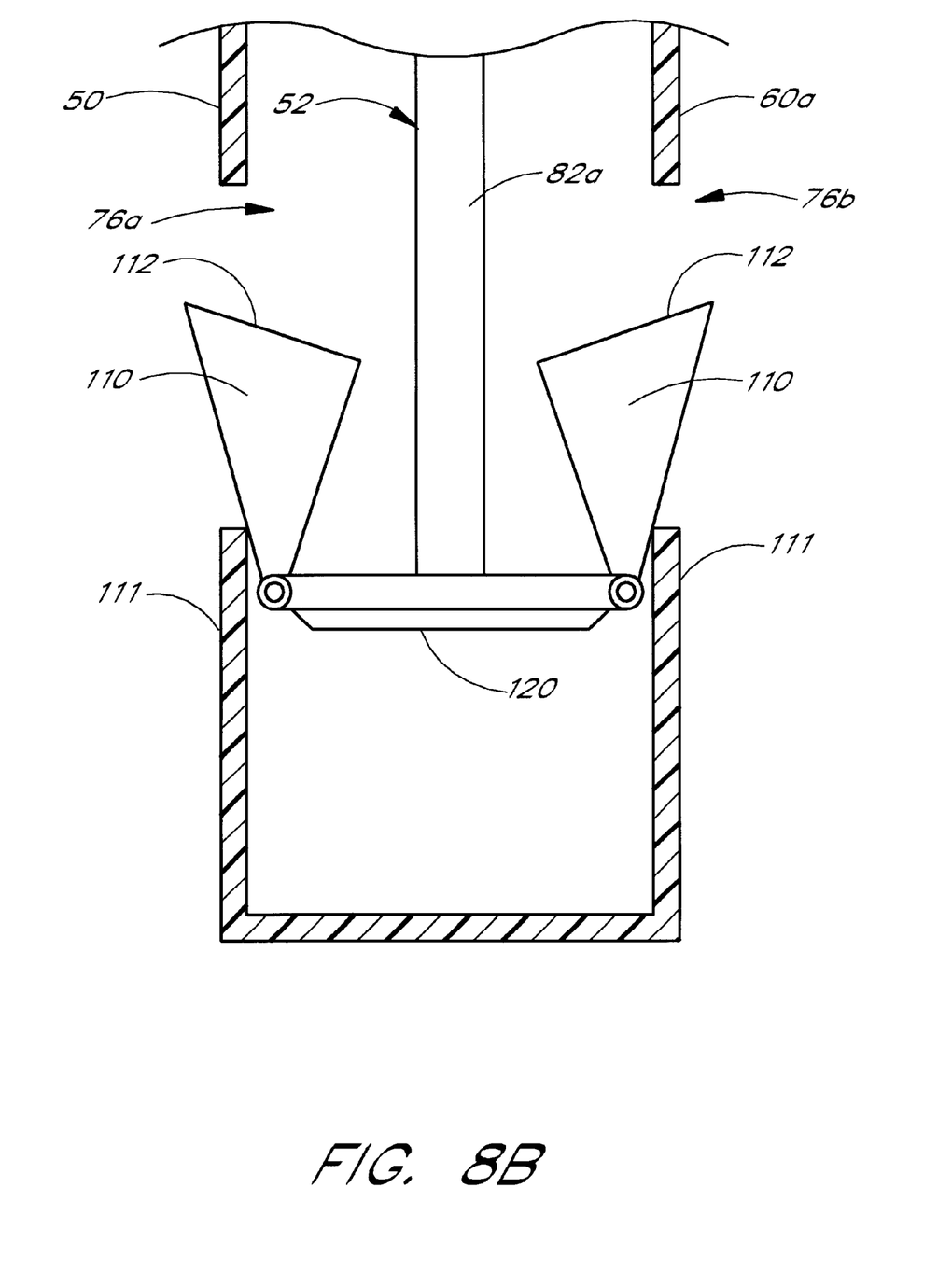

FIGS. 8A–8C are cross-sectional views of the leg 82a of the inner member 52 positioned within the leg 60a of the outer member 50. FIGS. 8A–8C successively illustrate the change in relationship between the leg 82a and the leg 60a as the support member 110 is moved from the locked position to the unlocked position. This occurs as the leg 82a of the inner member 52 slides within the leg 60a of the outer member 50, or as the tray carrier 30 moves from the non-support position to the support position. FIG. 8A shows the relative positions of the legs 82a and 60a when the tray carrier is in the non-support position (FIG. 6A). In that configuration, the support members 110 are restrained in the locked position by the walls 111 of the leg 60a of the outer member 50. That is, the support members 110 abut against the walls 111 of the leg 60a of the outer member 50 so that the walls 111 prevent the support members 110 from moving to the extended position.

FIG. 8B illustrates the support members 110 of the leg 82a in an intermediate position between the retracted position and the extended position. As the leg 82a of the inner member 52 slides upward within the leg 60a of the outer member 50, the support members 110 gradually move into alignment or communication with the apertures 76a and 76b in the leg 60a of the outer member 50. As the support members 110 align with the respective apertures 76, the elastic band 120 causes the support members 110 to gradually move outward to the extended position through the apertures 76a and 76b in the leg 60a of the outer member 50.

FIG. 8C shows the relative orientation of the legs 60a and 82a when the tray carrier 30 is in the support position. The support members 110 are fully aligned with the apertures 76a and 76b so that the walls 111 of the leg 60a of the outer member 50 no longer restrain the support members 110 in the retracted position. With the walls of the leg 60a no longer restraining the support members 110, they are free to move to the extended position through the apertures 76a and 76b. The elastic band 120 thus causes the support members 110 to automatically spring to the unlocked position when the tray carrier 30 is moved to the support position. Thus, a user may move the support members 110 to the unlocked position by squeezing the handle 84 of the inner member 52 towards the handle 62 of the outer member 50 so that the support members 110 align with the apertures 76a and 76b in the respective leg 60 of the outer member 50.

In operation, the tray carrier 30 is used to support a plurality of trays 34 arranged in a stack 32. In one embodiment, a user first positions the tray carrier 30 above the stack 32 of trays 34, as shown in FIG. 1. The tray carrier 30 is normally in the non-support position (FIG. 6A) prior to the legs 44 being inserted into the trays 34. The biasing members 126 (FIG. 7) between the handle 84 of the inner member 52 and the handle 62 of the outer member 50 urge the tray carrier 30 to normally remain in the non-support position.

The user then inserts the legs 44 of the tray carrier 30 into the corresponding holes 38 in the trays 34 until the bottom 44 of the legs protrude through the lowermost tray 34 in the stack 32. The user may then move the tray carrier 30 into the support position wherein the support members 110 are moved into the unlocked position. As mentioned, the user moves the tray carrier 30 into the support position by squeezing the handle 84 of the inner member 52 towards the handle 62 of the outer member 50. This causes the support members 110 to move to the unlocked position wherein the support members 110 protrude through the apertures 76 in the legs 60 of the outer member 50. When protruding as such, the support members 110 define a support plane upon which the stack 32 of trays 34 may be rested.

Figure 9:
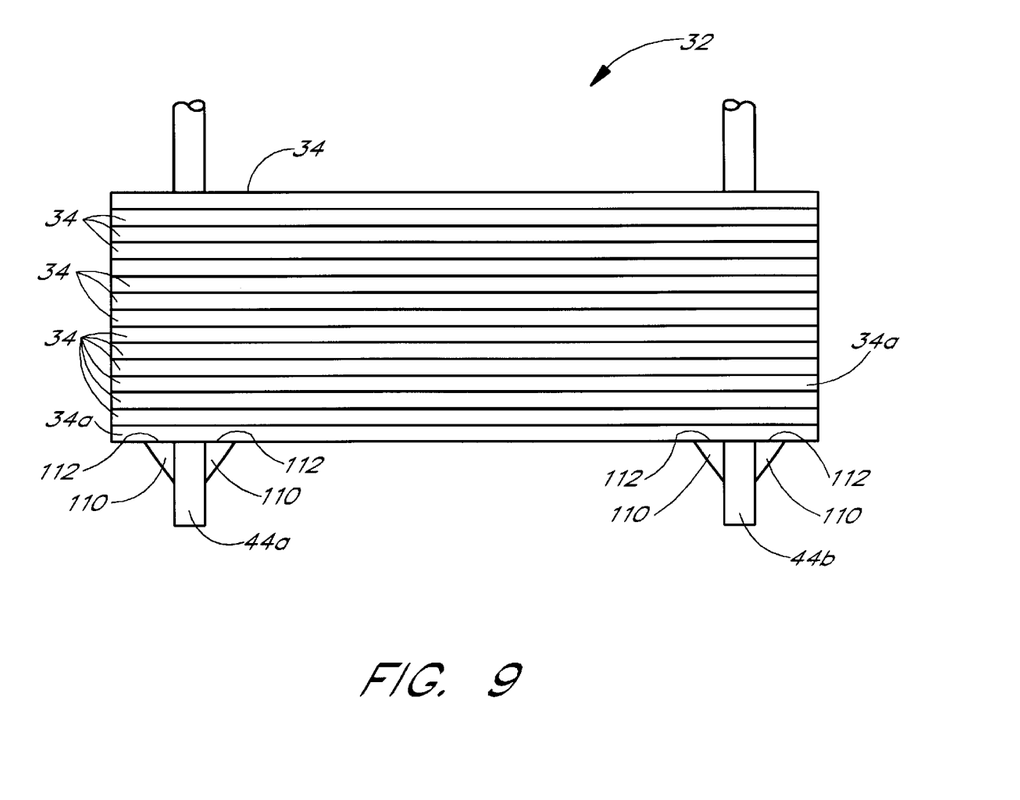
FIG. 9 is a side view of a bottom portion of the tray carrier shown supporting a stack of TSOP trays.

FIG. 9 is a side view of the stack 32 of trays 34 with the legs 44 of the tray carrier 30 protruding through the lowermost tray 34a. The tray carrier 30 is shown in the support position wherein the support members 110 protrude outward through the legs 60 of the outer member 50. In this position, the support edges 112 of the support members 110 collectively provide a support surface for the bottom most tray 34a. Thus, the bottom most tray 34a in the stack 32 rests on the support edges 112 of the support members 110. The user may then lift the tray carrier 30 with the stack 32 of trays 34 supported by the support edges 112 of the support members 110. Typically, the user continues to squeeze the handle 84 of the inner member against the handle 62 of the outer member to keep the tray carrier 30 in the support position so that the support members 110 continue to collectively provide support to the stack 32 of trays 34. The pressure of the trays 34 on the support edges 112 also holds the support members 110 in the support position. Alteratively, the handles 62 or 84 could be provided with retaining devices, such as hooks, that may be used to retain the handles 62 and 84 against one another.

With the tray carrier 30 in the support position, the user may carry the stack 32 of trays 34 to any desired location. When the user reaches the desired location, he or she releases the grip on the handles 84 and 62 of the inner member 52 and outer member 50, respectively. Consequently, the biasing member 126 causes the tray carrier 30 to return to the non-support position so that the support members 110 are locked within the legs 60 of the outer member 50, as described above with respect to FIG. 8A. The user may then slide the legs 44 of the tray carrier 30 out of the holes 38 of the stack 32 of trays 34.

The tray carrier 30 thus provides a convenient and easy way for a user to carry a stack 32 of TSOP trays 34. The user may easily insert the legs 44 of the tray carrier 30 into the holes 38 in the trays 34 and then carry the trays 34 to any desired location. The tray carrier 30 removes the difficulty usually associated with moving a tall stack 32 of trays 34.

Hence, although the foregoing description of the invention has shown, described, and pointed out fundamental novel features of the invention, it will be understood that various omissions, substitutions, and changes in the form of the detail of the apparatus and method as illustrated as well as the uses thereof, may be made by those skilled in the art without departing from the spirit of the invention. Consequently, the scope of the invention should not be limited to the foregoing discussion, but should be defined by the appended claims.

What is claimed is:

1. A method of moving a stack of trays, comprising:
   stacking a plurality of trays atop one another to form a stack of trays, wherein each of said tray has a plurality of apertures therein and wherein said step of stacking includes aligning apertures in adjacent trays with each other and inserting each of a plurality of legs of a tray carrier into a corresponding one of said plurality of apertures in the stack of trays;
   locking the tray carrier to the stack of trays; and
   lifting the tray carrier so that the tray carrier supports the stack of trays.

2. The method of claim 1, wherein locking the tray carrier to the stack of trays comprises extending a plurality of support members outward from bottom ends of the plurality of legs of the tray carrier so that the support members define a support surface for the stack of trays.

3. The method of claim 2, additionally comprising retracting the support members so that the support members no longer provide a support surface for the stack of trays.

4. The method of claim 3, additionally comprising releasing the tray carrier from the stack of trays.

5. The method of claim 4, wherein releasing the tray carriers from the stack of trays comprises removing the plurality of legs from the plurality of apertures in the stack of trays.

6. The method of claim 2, additionally comprising sliding an inner leg of the tray carrier within an outer leg of the tray carrier such that at least a portion of the inner leg extends downward within the outer leg so as to extend the associated support members.

7. The method of claim 1, additionally comprising lowering the stack of trays into a chip handler.

8. A method of transporting a stack of trays, comprising:

forming a stack of trays such that a bottommost tray supports the other trays in said stack of trays;

coupling a plurality of legs of a tray carrier to the stack of trays so that a plurality of support members on the legs provide a support surface for the bottommost tray in the stack of trays; and lifting the tray carrier so that the support surface supports the stack of trays.

9. The method of claim 8, wherein forming a stack of trays comprises stacking a plurality of trays atop one another so that a plurality of apertures in the trays are aligned with one another.

10. The method of claim 9, wherein coupling the plurality of legs of the tray carrier to the stack of trays comprises inserting the legs of the tray carrier into the plurality of apertures in the stack of trays.

11. The method of claim 9, additionally comprising inserting the legs of the tray carrier into the plurality of apertures until bottom ends of the plurality of legs protrude through apertures in the bottommost tray in the stack of trays.

12. The method of claim 8, wherein coupling the plurality of legs of the tray carrier comprises extending a plurality of support members outward from bottom ends of the plurality of legs so that the stack of trays rests on the support members.

13. The method of claim 12, additionally comprising extending the support members so that support edges of the support members are aligned in a common plane.

14. The method of claim 8, additionally comprising uncoupling the tray carrier from the stack of trays.

15. The method of claim 14, wherein uncoupling the tray carrier from the stack of trays comprises removing the legs of the tray carrier from a plurality of apertures in the stack of trays.

16. The method of claim 8, additionally comprising lowering the stack of trays into a chip handler.

17. The method of claim 8, additionally comprising extending an inner leg of the tray carrier within an outer leg of the tray carrier to thereby extend the support members.

18. A method of carrying at least one tray, comprising:

inserting a leg of a tray carrier through an aperture in the at least one tray so that a bottom end of the leg protrudes through the bottom of the at least one tray;

extending a support member outward from a retracted position within the leg, such that the support member contacts the bottom end of the at least one tray so as to provide a support surface for the tray; and lifting the tray carrier so that the at least one tray rests on the support surface of the support member.

19. The method of claim 18, additionally comprising forming a stack of trays upon the at least one tray such that said stack of trays is supported by the support member.

* * * * *